(12) United States Patent
Morton et al.

(10) Patent No.: US 6,721,770 B1
(45) Date of Patent: Apr. 13, 2004

(54) RECURSIVE STATE ESTIMATION BY MATRIX FACTORIZATION

(75) Inventors: Blaise Grayson Morton, Roseville, MN (US); Michael Ray Elgersma, Plymouth, MN (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/425,814

(22) Filed: Oct. 25, 1999

(51) Int. Cl.$^7$ .................. G06F 17/10; G06F 15/00; G06F 19/00
(52) U.S. Cl. .................. 708/300; 702/190; 702/104
(58) Field of Search .................. 708/300; 702/104, 702/150, 183, 190; 703/2; 375/355

(56) References Cited

U.S. PATENT DOCUMENTS

| | | | | |
|---|---|---|---|---|
| 4,937,763 A | * | 6/1990 | Mott | 702/183 |
| 5,430,445 A | * | 7/1995 | Peregrim et al. | 342/25 |
| 5,506,794 A | * | 4/1996 | Lange | 702/104 |
| 5,832,046 A | * | 11/1998 | Li et al. | 375/355 |
| 5,991,525 A | * | 11/1999 | Shah et al. | 703/2 |
| 6,202,033 B1 | * | 3/2001 | Lange | 702/104 |
| 6,246,929 B1 | * | 6/2001 | Kaloust | 701/11 |
| 6,292,758 B1 | * | 9/2001 | Gilbert et al. | 702/150 |

OTHER PUBLICATIONS

Donald, Estimation of Random States in General Linear Model, Feb. 1991, IEEE Transactions on Automatic Control vol. 36, No. 2, p. 248–252.*

Zhang et al., A parallel Decoupled Kalman Filtering Algorithm and Systolic Architecture, 1993, IEEE, p. 3590–3595.*

Hargrave, A Tutorial Introduction to Kalman Filtering, 1989, IEEE colloquium, p. 1–6.*

Stephan et al., Identification of Nonlinear Dynamic Systems with Recurrent Neural Networks and Kalman Filter Methods, 1996, IEEE, p. 341–344.*

Yuri Shtessel et al., Nonminimum Phase Output Tracking in Dynamic Sliding Manifolds with Application to Aircraft Control, 1996, IEEE, pp. 2071–2076.*

Andrew H. Jazwinski, "Applications of Linear Theory", *Stochastic Processes and Filtering Theory*, 1970, pp. 266–281.

* cited by examiner

*Primary Examiner*—Chuong Dinh Ngo
*Assistant Examiner*—Chat Do

(57) ABSTRACT

A filter is disclosed for recursive state estimation of a process by matrix factorization. The filter preferably takes the general form of P=XY, where P is a matrix of previous state and/or current observations, Y is a matrix of functions that are used to model the process, and X is a coefficient matrix relating the functions in matrix Y to the previous state and/or current observations of matrix P. Given the previous state and/or current observations, a value for matrix Y can be computed from which a current state estimate can be recovered.

34 Claims, 20 Drawing Sheets

CALCULATE FLIGHT PARAMETERS $p_0, \bar{q}, \alpha, \beta$

Measured or Calculated Parameters $$40 \Rightarrow \begin{bmatrix} p_1 & p_0 & \bar{q} & \alpha_{1\text{-}8} & \beta_{1\text{-}8} \\ p_2 & p_0 & \bar{q} & \alpha_{1\text{-}8} & \beta_{1\text{-}8} \\ \vdots & & & \vdots & \\ p_8 & p_0 & \bar{q} & \alpha_{1\text{-}8} & \beta_{1\text{-}8} \end{bmatrix}$$

Over Eight Different Combinations of $\alpha$ and $\beta$

*FIG. 14*

$$\begin{bmatrix} p_1 \\ p_2 \\ \vdots \\ p_8 \end{bmatrix} = \begin{bmatrix} X_{11} & X_{12} & \cdots & X_{17} \\ X_{21} & & & \vdots \\ \vdots & & \ddots & \\ X_{81} & & \cdots & X_{87} \end{bmatrix} \begin{bmatrix} p_0 \\ \bar{q} \\ \bar{q}\alpha \\ \bar{q}\beta \\ \bar{q}\alpha^2 \\ \bar{q}\alpha\beta \\ \bar{q}\beta^2 \end{bmatrix}$$

FIG. 15

$$\bar{X} = X\,W$$

$$W = \begin{bmatrix} p_0 & 0 & 0 & 0 & 0 & 0 & 0 \\ 0 & \bar{q} & 0 & 0 & 0 & 0 & 0 \\ 0 & 0 & \bar{q}\alpha_0 & 0 & 0 & 0 & 0 \\ 0 & 0 & 0 & \bar{q}\beta_0 & 0 & 0 & 0 \\ 0 & 0 & 0 & 0 & \bar{q}\alpha^2_0 & 0 & 0 \\ 0 & 0 & 0 & 0 & 0 & \bar{q}\alpha_0\beta_0 & 0 \\ 0 & 0 & 0 & 0 & 0 & 0 & \bar{q}\beta^2_0 \end{bmatrix}$$

FIG. 16

$$\overline{X} = \begin{bmatrix} X_{11}p_0 & X_{12}\overline{q} & X_{13}\overline{q}\alpha_0 & X_{14}\overline{q}\beta_0 & X_{15}\overline{q}\alpha^2{}_0 & X_{16}\overline{q}\alpha_0\beta_0 & X_{17}\overline{q}\beta_0^2 \\ X_{21}p_0 & X_{22}\overline{q} & X_{23}\overline{q}\alpha_0 & X_{24}\overline{q}\beta_0 & X_{25}\overline{q}\alpha^2{}_0 & X_{26}\overline{q}\alpha_0\beta_0 & X_{27}\overline{q}\beta_0^2 \\ X_{31}p_0 & X_{32}\overline{q} & X_{33}\overline{q}\alpha_0 & X_{34}\overline{q}\beta & X_{35}\overline{q}\alpha^2{}_0 & X_{36}\overline{q}\alpha_0\beta_0 & X_{37}\overline{q}\beta_0^2 \\ X_{41}p_0 & X_{42}\overline{q} & X_{43}\overline{q}\alpha_0 & X_{44}\overline{q}\beta & X_{45}\overline{q}\alpha^2{}_0 & X_{46}\overline{q}\alpha_0\beta_0 & X_{47}\overline{q}\beta_0^2 \\ X_{51}p_0 & X_{52}\overline{q} & X_{53}\overline{q}\alpha_0 & X_{54}\overline{q}\beta & X_{55}\overline{q}\alpha^2{}_0 & X_{56}\overline{q}\alpha_0\beta_0 & X_{57}\overline{q}\beta_0^2 \\ X_{61}p_0 & X_{62}\overline{q} & X_{63}\overline{q}\alpha_0 & X_{64}\overline{q}\beta & X_{65}\overline{q}\alpha^2{}_0 & X_{66}\overline{q}\alpha_0\beta_0 & X_{67}\overline{q}\beta_0^2 \\ X_{71}p_0 & X_{72}\overline{q} & X_{73}\overline{q}\alpha_0 & X_{74}\overline{q}\beta & X_{75}\overline{q}\alpha^2{}_0 & X_{76}\overline{q}\alpha_0\beta_0 & X_{77}\overline{q}\beta_0^2 \end{bmatrix}$$

$$X = \begin{bmatrix} X_1 \\ \hline X_2 \end{bmatrix}$$ — 108

$$\begin{bmatrix} X_2 \\ \hline X_1 \end{bmatrix} = \begin{bmatrix} X_1 \\ \hline X_2 \end{bmatrix} E$$ — 110

— 112

$$E = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & -1 & 0 & 0 & 0 \\ 0 & 0 & 0 & 0 & 1 & 0 & 0 \\ 0 & 0 & 0 & 0 & 0 & -1 & 0 \\ 0 & 0 & 0 & 0 & 0 & 0 & 1 \end{bmatrix}$$

*FIG. 18*

$$Y(i) = \begin{bmatrix} p_0 \\ \bar{q} \\ \bar{q}\alpha \\ \bar{q}\beta \\ \bar{q}\alpha^2 \\ \bar{q}\alpha\beta \\ \bar{q}\beta^2 \end{bmatrix} \quad 122 \quad \text{118}$$

$$M = \begin{bmatrix} y2 & y3 & y4 \\ y3 & y5 & y6 \\ y4 & y6 & y7 \end{bmatrix} = \begin{bmatrix} \bar{q} & \bar{q}\alpha & \bar{q}\beta \\ \bar{q}\alpha & \bar{q}\alpha^2 & \bar{q}\alpha\beta \\ \bar{q}\beta & \bar{q}\alpha\beta & \bar{q}\beta^2 \end{bmatrix} \quad 126$$

M has a Singular Value Decomposition (SVD) of the form:

$$M = \begin{bmatrix} u_1 \\ u_2 \\ u_3 \end{bmatrix} \sigma_1 \begin{bmatrix} u_1 & u_2 & u_3 \end{bmatrix} \quad 130$$

where, $$\sigma_1 = \bar{q}[1 + \alpha^2 + \beta^2]$$

$$u_1 = \frac{1}{\sqrt{1 + \alpha^2 + \beta^2}}$$

$$u_2 = \frac{\alpha}{\sqrt{1 + \alpha^2 + \beta^2}}$$

$$u_3 = \frac{\beta}{\sqrt{1 + \alpha^2 + \beta^2}}$$

*FIG. 19*

$$p_0 = y1$$
$$\bar{q} = y2 = u_1\sigma_1 u_1 = \sigma_1 u_1^2$$
$$\alpha = \frac{y3}{y2} = \frac{u_2\sigma_1 u_1}{\sigma_1 u_1^2} = \frac{u_2}{u_1}$$
$$\beta = \frac{y4}{y2} = \frac{u3\sigma_1 u1}{\sigma_1 u_1^2} = \frac{u3}{u_1}$$

FIG. 20

$$Y(i) = \begin{bmatrix} p_0 \\ \bar{q} \\ \bar{q}\alpha \\ \bar{q}\beta \\ \bar{q}\alpha^2 \\ \bar{q}\alpha\beta \\ \bar{q}\beta^2 \end{bmatrix}$$

↙ 200

$\text{resid1}(i) = y2y5 - y3^2 = 0 = \bar{q}(\bar{q}\alpha^2) - (\bar{q}\alpha)^2$ $\text{resid2}(i) = y2y6 - y2y3 = 0 = \bar{q}(\bar{q}\alpha\beta) - \bar{q}(\bar{q}\alpha)$ $\text{resid3}(i) = y2y7 - y4^2 = 0 = \bar{q}(\bar{q}\beta^2) - (\bar{q}\beta)^2$

FIG. 21

A = PARTICULAR Y(i,j)  
SOLUTION TO P(i,j) = X(i,j)Y(i,j)

B = SOLUTION SATISFYING THE HOMOGENEOUS EQUATION X(i,j)B = 0

$$Y(i,j) = \begin{bmatrix} p_{0A} + \lambda p_{0B} \\ \bar{q}_A + \lambda \bar{q}_B \\ \bar{q}_A \alpha_A + \lambda \bar{q}_B \alpha_B \\ \bar{q}_A \beta_A + \lambda \bar{q}_B \beta_B \\ \bar{q}_A \alpha_A^2 + \lambda \bar{q}_B \alpha_B^2 \\ \bar{q}_A \alpha_A \beta_A + \lambda \bar{q}_B \alpha_B \beta_B \\ \bar{q}_A \beta_A^2 + \lambda \bar{q}_B \beta_B^2 \end{bmatrix}$$

↙ 216

$\text{resid1}(i,j) = y2y5 - y3^2 = 0 = (\bar{q}_A + \lambda q_B)(\bar{q}_A \alpha_A^2 + \lambda \bar{q}_B \alpha_B^2) - (\bar{q}_A \alpha_A + \lambda \bar{q}_B \alpha_B)^2$ $\text{resid2}(i,j) = y2y6 - y2y3 = 0 = (\bar{q}_A + \lambda q_B)(\bar{q}_A \alpha_A \beta_A + \lambda \bar{q}_B \alpha_B \beta_B) - (\bar{q}_A + \lambda q_B)(\bar{q}_A \alpha_A + \lambda \bar{q}_B \alpha_B)$ $\text{resid3}(i,j) = y2y7 - y4^2 = 0 = (\bar{q}_A + \lambda q_B)(\bar{q}_A \beta_A^2 + \lambda \bar{q}_B \beta_B^2) - (\bar{q}_A \beta_A + \lambda \bar{q}_B \beta_B)^2$

FIG. 22

RECURSIVE STATE ESTIMATION BY MATRIX FACTORIZATION

BACKGROUND OF THE INVENTION

This invention relates to methods for recursive state estimation for discrete-data controlled processes, and more particularly to recursive state estimation for discrete-data controlled processes by matrix factorization.

Due in large part to the rapid advancement in electronics and software technologies, the automation and control of many processes, including non-linear processes, has become increasingly popular. In many instances, discrete-data observations are taken in real-time and provided to a processor or the like. The processor uses the discrete data observations to estimate the current state of various parameters, which may or may not be directly observable or measurable.

Because it is often desirable to provide real time estimation, it is advantageous to operate sequentially on the discrete-data observations, and generate new state estimates as new observations become available. One method of providing such real time state estimates is through the use of a Kalman filter. A Kalman filter is a set of linear equations that provide a recursive solution of the least-squares method. It is recognized that Kalman filters are generally useful in providing state estimation of discrete-data controlled processes that are governed by linear stochastic equations.

To provide state estimation for non-linear discrete-data controlled processes, extended Kalman filters have been developed. Extended Kalman filters operate by providing a linear approximation to the non-linear discrete-data controlled process, often by using partial derivatives of the process and measurement functions. A limitation of both the Kalman filter and the extended Kalman filter is that they both are fundamentally linear in nature. What would be desirable, therefore, is a non-linear filter for estimating the state of non-linear discrete-data controlled processes. It is believed that by applying a non-linear filter to non-linear discrete-data controlled process, more accurate and more cost effective solutions can be obtained.

SUMMARY OF THE INVENTION

The present invention overcomes many of the disadvantages of the prior art by providing a filter and method for recursive state estimation by matrix factorization. The filter preferably takes the general form of P=XY, where P is a matrix of previous state and/or current observations, Y is a matrix of functions that are used to model the process, and X is a coefficient matrix relating the functions in the Y matrix to the previous state and/or current observations of the P matrix. Given the previous state and/or current observations, a value for the Y matrix can be computed from which a current state estimate can be recovered. Because the filter of the present invention provides recursive state estimation by matrix factorization, the filter may be easily applied to both linear and non-linear processes.

In a first illustrative embodiment, a non-linear filter is provided that takes the general form of P=XY, where P is a matrix that includes a number of current observations, Y is a matrix of functions, including non-linear functions, that model a non-linear process, and X is a coefficient matrix relating the functions in the Y matrix to the current observations of the P matrix. The non-linear filter calculates value of the functions in the Y matrix using the current observations of the P matrix and selected coefficients of the X matrix. Using the calculated values of the Y matrix, the non-linear filter estimates the current state of the non-linear process by estimating the current value of selected process parameters.

Preferably, an X matrix is calculated for each of a number of preselected process conditions during an initialization, calibration, or setup procedure. Accordingly, a different X matrix may be scheduled for different current process conditions. In one embodiment, after a current process condition is identified, preferably by examining the current observations in the P matrix, a particular X matrix is selected and scheduled for use to calculate the values of the functions in the Y matrix.

To reduce the number of calculations that must be performed, it is desirable to reduce the number of non-zero coefficients in each X matrix. In one illustrative embodiment, this is accomplished by eliminating those coefficients in each X matrix that will not have a significant contribution to the overall result. To identify these coefficients, a diagonal matrix W is provided for each preselected process condition. The diagonal matrix W is then multiplied with the corresponding X matrix to compute a normalized X matrix. Thereafter, the largest entry in each row of the normalized X matrix is identified, and those entries in each row that fall below a predetermined threshold value relative to the largest entry are identified. Finally, those coefficients of the X matrix that correspond to the entries of the corresponding normalized X matrix that fall below the predetermined threshold are set to zero, resulting in a reduced X matrix for each preselected process condition. Further reductions in the X matrices may be obtained by taking into account certain symmetry in the observations. These and other reduction techniques may help reduce the processing time required to calculate the values of the functions in the Y matrix.

Selecting the appropriate X matrix may be done in a variety of ways. In one illustrative embodiment, the X matrix that corresponds to the nearest preselected process condition is selected. In another embodiment, an interpolated X matrix is calculated from the three nearest preselected process conditions, preferably by using barycentric interpolation. The selected X matrix is used to calculate the values of the functions in the Y matrix at the current process condition.

Although it is contemplated that the present invention may be applied to many linear and non-linear processes, one example process may be a non-linear flight control process. The example flight control process may identify, for example, the static pressure, dynamic pressure, attack angle and sideslip of an airplane using a number of pressure measurements taken at various locations on the airplane.

In such a flight control process, the functions in the Y matrix preferably include the static pressure, the dynamic pressure, the dynamic pressure times the attack angle, the dynamic pressure times the sideslip, the dynamic pressure times the (attack angle)$^2$, the dynamic pressure times the attack angle times the sideslip, and the dynamic pressure times the (sideslip)$^2$. As can readily be seen, the last two functions in the Y matrix are non-linear. The selected process parameters that are used to estimate the state of the process may be static pressure, dynamic pressure, attack angle and sideslip. The current values for these process parameters may be extracted from the functions in the Y matrix using, for example, a singular value decomposition algorithm.

To increase the reliability of the system, it is often beneficial to determine if any of the sensors that provide the current observation data failed, preferably in real time. Once identified, the observations provided by the failed sensors can be removed from the analysis. In an illustrative embodiment, this can be accomplished by calculating a matrix Z, such that $Z^T X=0$). Thereafter, a scalar err1 may be calculated by multiplying the matrix $Z^T$ with the P matrix. If all of the sensors are functioning properly, the magnitude of err1 should be smaller than a predetermined threshold. If one or more of the sensors failed, the magnitude of err1 should be larger than the predetermined threshold.

If it is determined that one or more sensors failed, it is often desirable to identify the failed sensors. To identify the failed sensors, a system of equations P(i)=X(i)Y(i) may be provided. The system of equations P(i)=X(i)Y(i) corresponds to the relation P=XY with the $i^{th}$ row of the P and X matrix removed. With the $i^{th}$ row removed, the values of the functions in the Y(i) matrix can be calculated using the relation P(i)=X(i)Y(i). Next, a complete set of algebraic generators of the algebraic relations among the entries of the Y(i) matrix is provided. If all of the of the algebraic generators for any "i" are satisfied within a predetermined range, the one or more sensors that correspond to the $i^{th}$ observation are deemed to be faulty. Once identified, the faulty sensors may be disabled or otherwise removed from the system.

If none of the algebraic generators for any Y(i) are satisfied within a predetermined range, it is assumed that two sensors failed. For many military and other high reliability applications, it is desirable to retain full functionality even when two sensors fail. To identify the failed sensors, a system of equations P(i,j)=X(i,j)Y(i,j) may be provided, which correspond to the relation P=XY with the $i^{th}$ row and the $j^{th}$ row of the P matrix and X matrix removed. With the $i^{th}$ row and $j^{th}$ row removed, the values of functions in the Y(i,j) matrix can be determined using the relation P(i,j)=X(i,j)Y(i,j). Depending on the rank of the X(i,j) matrix, one solution or a family of solutions may exist as further described below. In either case, a complete set of algebraic generators of the algebraic relations among the entries of the Y(i,j) matrix are provided. These algebraic generators may be the same algebraic generators as described above. If all of the algebraic generators for any "i,j" pair are satisfied within a predetermined range, the sensors that correspond to the $i^{th}$ observation and the $j^{th}$ observation are deemed to have failed. Once identified, the failed sensors may be disabled or otherwise removed from the system.

As indicated above, removing the $i^{th}$ row or the $i^{th}$ and $j^{th}$ row of the X matrix may reduce the rank of the X(i) matrix or X(i,j) matrix, respectively, relative to the original X matrix. If the rank of the original X matrix is large enough, the rank of the X(i) matrix and X(i,j) matrix may be sufficient to render a single solution. However, if the rank of the original X matrix is not large enough, there may be a family of solutions for the values of the functions in the Y(i) matrix and the Y(i,j) matrix.

When only the $i^{th}$ row of the X matrix is removed, the family of solutions may take the form Y(i)=A+λB, where matrix A is a particular solution for Y(i), matrix B satisfies the homogeneous equation X(i)B=0, and λ is a scalar. In this case, a one parameter search over λ may be performed to identify if all of the algebraic generators for any Y(i) can be satisfied within a predetermined range. If a $\lambda_0$ exists that causes all of the algebraic generators for any "i" to be satisfied within a predetermined range, the one or more sensors that correspond to the $i^{th}$ observation are deemed to have failed.

Likewise, when both the $i^{th}$ row and the $j^{th}$ row are removed, the family of solutions may take the form Y(i,j)= A+λB, where matrix A is a particular solution for Y(i,j), matrix B satisfies the homogeneous equation X(i,j)B=0, and λ is a scalar. Like above, a one parameter search over λ may be performed to identify if all of the algebraic generators for any Y(i,j) are satisfied within a predetermined range. If a $\lambda_0$ exists that causes all of the algebraic generators for any "i,j" pair to be satisfied within a predetermined range, the one or more sensors that correspond to the $i^{th}$ observation and the $j^{th}$ observation are deemed to have failed. Once identified, the failed sensors may be disabled or otherwise removed from the system. A similar approach may also be applied to situations where three or more observations have failed.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 14 shows illustrative flow characterization data taken at each flight condition of FIG. 13;

FIG. 15 shows illustrative P, X and Y matrices, and the relation P=XY;

FIG. 16 shows an illustrative diagonal matrix W having functions in the Y matrix along its diagonal;

FIG. 17 shows a normalized X matrix produced by multiplying the diagonal matrix W of FIG. 16 by an original X matrix;

FIG. 18 shows another method for reducing the number of coefficients of the X matrix by providing special symmetric sensor configurations;

FIGS. 19–20 show an illustrative method for calculating the current flight parameters from the functions in the Y matrix using a single value decomposition algorithm;

FIG. 21 shows illustrative algebraic generators for a Y matrix that has a single solution; and FIG. 22 shows illustrative algebraic generators for a Y matrix that has a family of solutions.

DETAILED DESCRIPTION OF THE PREFERRED EMBODIMENTS

The present invention provides a filter and method for recursive state estimation by matrix factorization. The filter preferably takes the form P=XY, where P is a matrix of previous state and/or current observations, Y is a matrix of functions that are used to model the process, and X is a coefficient matrix relating the parameters of matrix Y to the previous state and/or current observations of matrix P. Thus, XY is a matrix factorization of P. Given the previous state and/or current observations, a value for matrix Y can be computed from which a current state estimate can be recovered. While the present invention may be used to estimate the state of many different processes, including linear and non-linear processes, a non-linear flight control process is used as an example process below.

EXAMPLE

Figure 1:
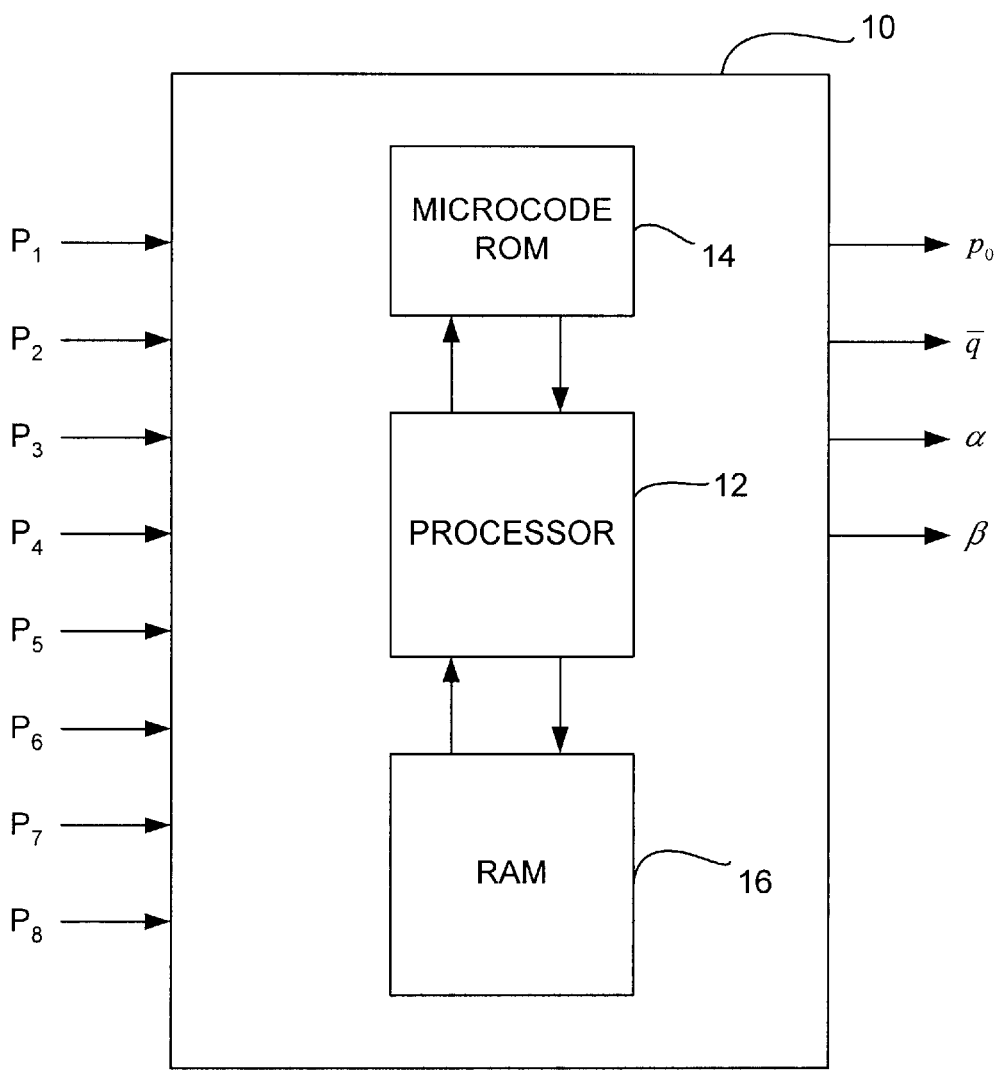
FIG. 1 is a schematic diagram of a filter in accordance with the present invention.

FIG. 1 is a schematic diagram of a non-linear filter for estimating the current state of the non-linear flight control process. The non-linear filter is generally shown at 10, and receives a number of pressure measurements P1, P2, ... P8 as inputs from various pressure sensors located on the airplane. The non-linear filter uses the various pressure measurements to estimate a number of flight parameters, including static pressure $P_0$, dynamic pressure q-bar, attack angle $\alpha$, and sideslip $\beta$, as shown.

Non-linear filter includes a processor 12 for performing the desired computations, a microcode ROM 14 for storing instructions for processor 12, and a RAM 16 for providing storage space that is accessible to processor 12. The instructions stored in ROM 14 preferably cause the processor to implement a filter having the general form of P=XY, where P is a matrix of the current pressure measurements P1, P2, ... P8, Y is a matrix of functions including $p_0$, q-bar, (q-bar)($\alpha$), (q-bar)$\beta$, (q-bar)($\alpha$)$^2$, (q-bar) ($\alpha$)($\beta$), and (q-bar) ($\beta$)$^2$ which are used to model the flight control process, and X is a coefficient matrix relating the functions in matrix Y to the current pressure measurements P1, P2, ... P8 of the matrix P. Given the current pressure measurements P1, P2, ... P8 and an appropriate X matrix, the processor 12 calculates a value for functions in the Y matrix, from which the current state estimate of $p_0$, q-bar, $\alpha$, and $\beta$ can be recovered.

Preferably, the current pressure measurements P1, P2, ... P8 are captured in RAM 16 as they become available. The X matrices, which are preferably determined during an initialization or calibration procedure, are stored in either the microcode ROM 14 or RAM 16. Processor 12 accesses the pressure measurements P1, P2, ... P8 and an appropriate X matrix to calculate the functions in the Y matrix. From functions in the Y matrix, a current state estimate of $p_0$, q-bar, $\alpha$, and $\beta$ can be recovered.

Figure 2:
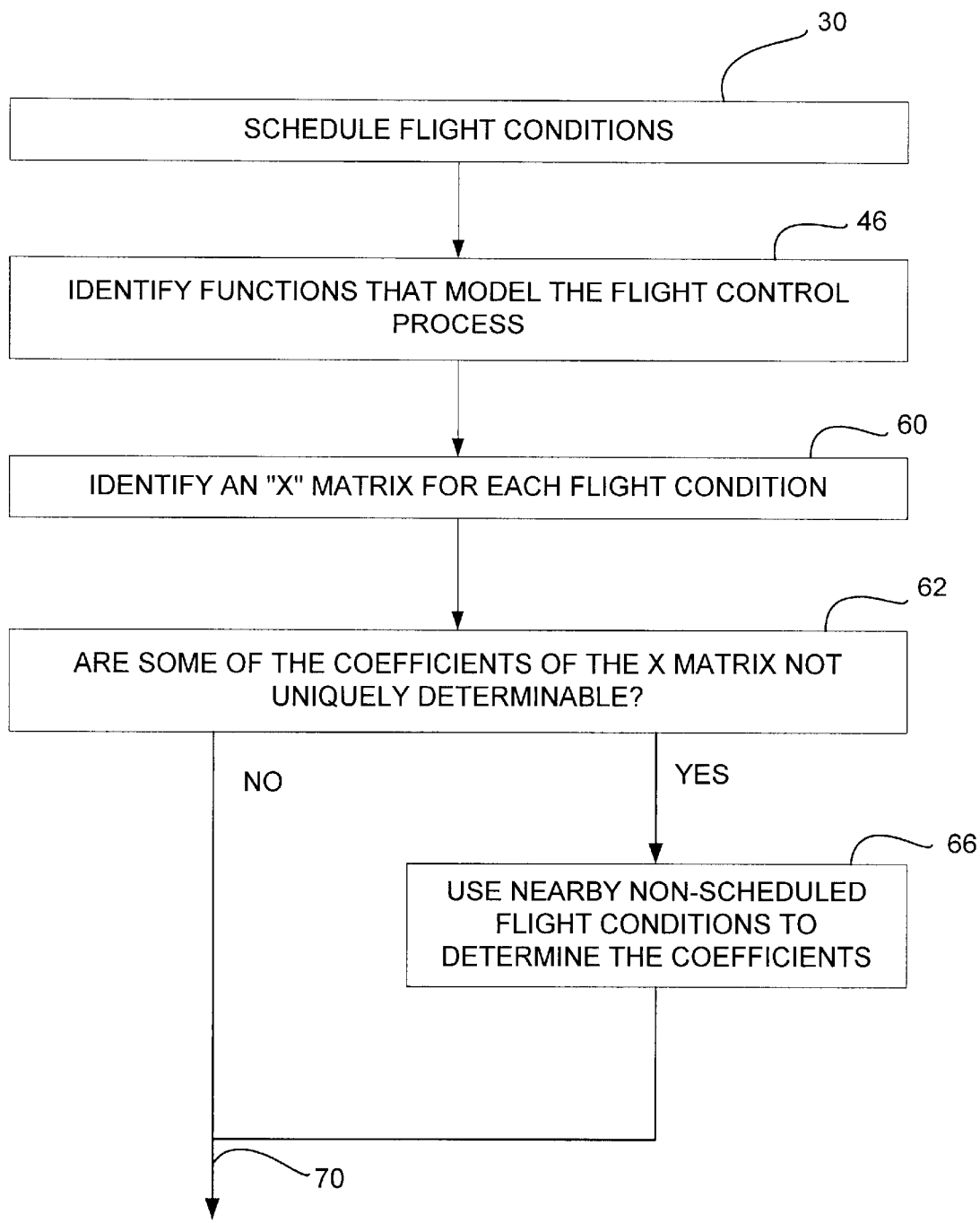
FIG. 2 is a flow diagram showing an illustrative method for characterizing flow control data in accordance with the present invention.
Figure 13:
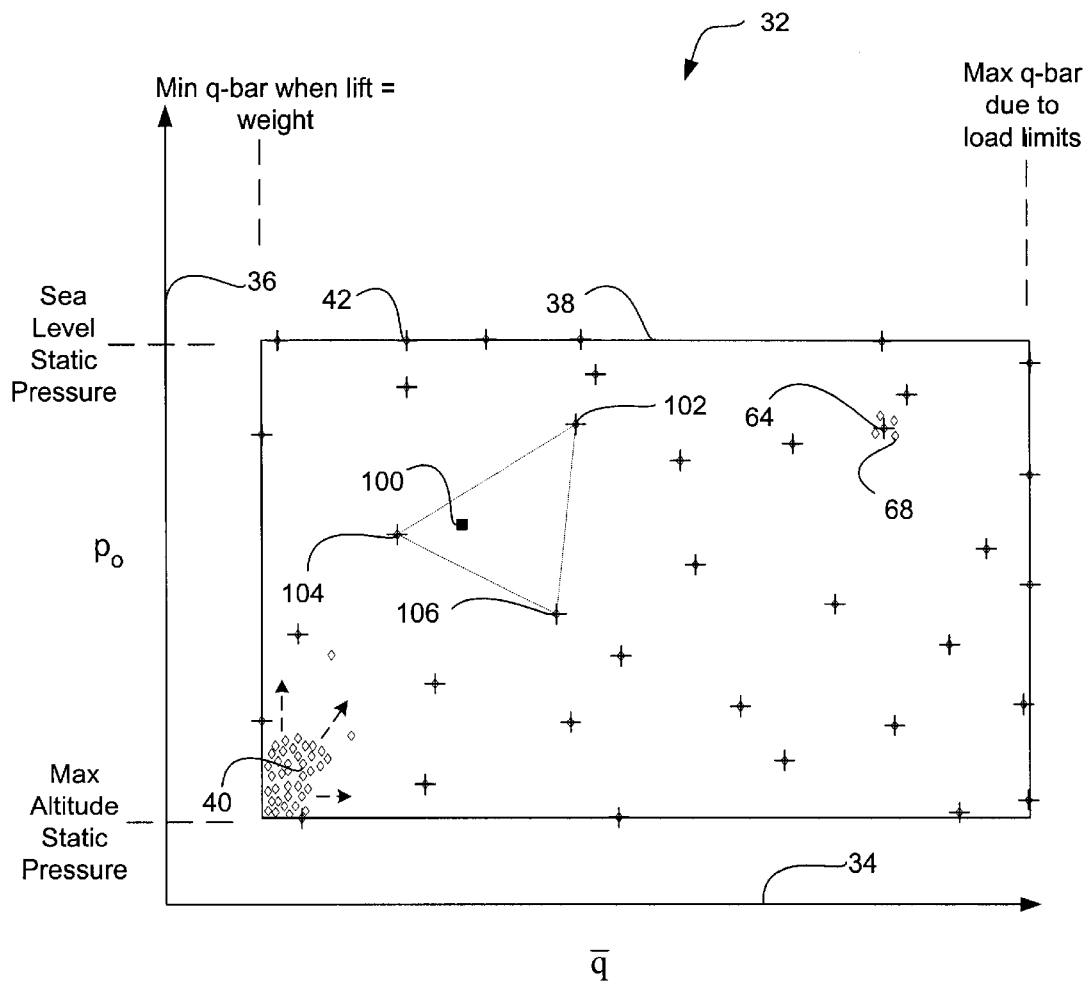
FIG. 13 shows an illustrative flight envelope having a number of flight conditions.

FIG. 2 is a flow diagram showing an illustrative method for characterizing flow control data in accordance with the present invention. The method begins by scheduling selected flight conditions, as shown at 30. Typically, an airplane or model thereof is constructed with the various pressure sensors located thereon. Using a wind tunnel or the like, flow characterization data is taken over the entire expected flight envelope. FIG. 13 shows an illustrative flight envelope 38, with flow characterization data 40 taken throughout the flight envelope 38. Each measurement may include, for example, the pressure measured by each pressure sensor P1, P2, ... P8 and the corresponding static pressure $p_0$. From the static pressure, the dynamic pressure q-bar can be calculated using the relation q-bar=$1/2\rho V^2$, where p is the density of air and V is the velocity of the wind. Finally, each of these measurements may be taken over, for example, eight combinations of attack angle $\alpha$ and sideslip $\beta$ as shown in FIG. 14. This typically provides a very large collection of flow characterization data that covers the entire flight envelope 38 of the airplane.

To reduce the amount of characterization data, only certain measurements are scheduled as fight conditions. In the embodiment shown in FIG. 13, thirty-seven different measurements have been scheduled as flight conditions, each designated by a large plus sign (+) as shown at 42. Typically, a number of measurements around the perimeter of the flight envelope 38 are scheduled, along with several inside the flight envelope.

Referring back to FIG. 2, once the flight conditions are scheduled, a number of functions or expressions are identified to model the non-linear flight control process, as shown at step 46. In the illustrative embodiment, the functions include the static pressure (p0), the dynamic pressure (q-bar), the dynamic pressure (q-bar) times the attack angle ($\alpha$), the dynamic pressure (q-bar) times the sideslip ($\beta$), the dynamic pressure (q-bar) times ($\alpha$)$^2$, the dynamic pressure (q-bar) times the attack angle ($\alpha$) times the sideslip ($\beta$), and the dynamic pressure (q-bar) times ($\beta$)$^2$. As can seen, the last two functions are non-linear. These functions are explicitly shown in Y matrix 54 of FIG. 15.

Once the functions in the Y matrix are identified, an X matrix is identified for each scheduled flight condition, as indicated at 60. The X matrices can often be extracted directly from the flow characterization data discussed above by solving the set of equations P=XY shown in FIG. 15 at each flight condition. Referring to FIG. 15, the matrix P 50 includes the eight pressure measurements P1, P2, ... P8 at a particular flight condition. The Y matrix 54 includes the functions or expressions used to model the non-linear flight control process. Since the flow characterization data includes values for each of the functions in the Y matrix, as shown in FIG. 14, each of the coefficients of the corresponding X matrix 52 can be computed. Some of the coefficients of the X matrix may be extraneous if the pressure sensor configuration is sufficiently symmetric, as further discussed below.

Referring now to step 62 of FIG. 2, it has been found that under some circumstances, some of the coefficients of the X matrices cannot be uniquely determined by examining a single flight condition. For example, and referring again to FIG. 14, the first two entries in the characterization data for each flight condition (e.g., static pressure and dynamic pressure) are typically the same for all values of $\alpha$ and $\beta$, and therefore cannot be uniquely determined. Thus, to allow resolution of the first two entries in the X matrix, nearby flight conditions may be used with $\alpha$ and $\beta$ set at zero, as indicated at step 66 of FIG. 2. This is more clearly shown in FIG. 13, where nearby flight conditions such as flight condition 68 may be used to uniquely determine the first two entries in the X matrix for flight condition 64. This part of the calibration procedure allows for correction of static defects, which are sometimes a significant source of calibration difficulties depending on vehicle configuration, sensor location and flight condition.

After an X matrix is defined for each scheduled flight condition, it can be desirable to reduce the number of non-zero coefficients in each X matrix. This reduces the number of calculations that must be performed by processor 12 of FIG. 1. In one illustrative embodiment, this is accomplished by eliminating those coefficients in each X matrix that will not significantly contribute to the overall result. To determine which coefficients will not contribute significantly, a diagonal matrix W can be provided for each scheduled process condition, as indicated at 78. An illustrative W matrix is shown in FIG. 16 at 80. Selected ones of the functions in the Y matrix are set to typical values that are representative of the function values at the corresponding process condition. For example, and as shown at step 76 in FIG. 3, representative values $\alpha_0$ and $\beta_0$ may be selected at the corresponding flight condition.

Figure 3:
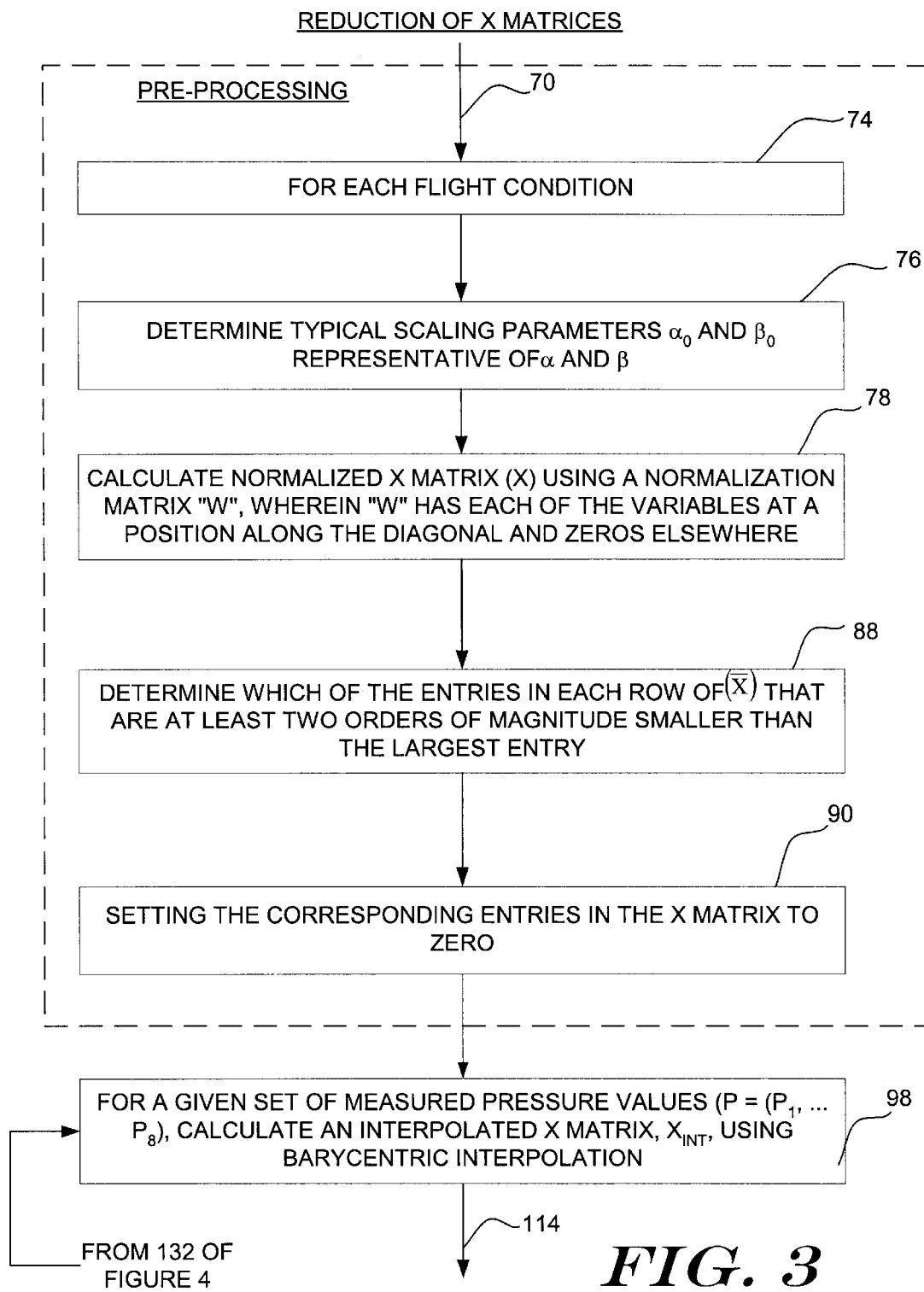
FIG. 3 is a flow diagram showing an illustrative method for reducing the number of non-zero coefficients in the X matrices, and generating an interpolated X matrix for a current flight condition.

The diagonal matrix W is multiplied by the corresponding X matrix to compute a corresponding normalized X matrix, as indicated at step 78 of FIG. 3. The normalized X matrix that is generated by multiplying the W matrix of FIG. 16 with the X matrix of FIG. 15 is shown in FIG. 17. With this scaling, the coefficients of the normalized X matrix can be meaningfully compared in magnitude to determine which are most significant. Accordingly, and as shown at 88 of FIG. 3, the largest entry in each row may be identified, and those entries that fall below a predetermined threshold value relative to the largest entry are noted. Once noted, the coefficients of the X matrix that correspond to those entries of the corresponding normalized X matrix that fall below the predetermined threshold are set to zero, as shown at step 90 of FIG. 3, resulting in a reduced X matrix for each scheduled process condition.

Further reductions in the X matrices may be obtained by taking into account certain symmetry in the observation measurements. Assume, for example, the eight pressure sensors are placed symmetrically, four on the left wing and four on the right wing, to provide bilateral symmetry. Assume also that pressure measurements P1, . . . P4 denote the left side measurements and P5, . . . P8 denote their counterparts on the right wing.

In this configuration, when $\beta$ changes sign, the values of the first four pressure measurements will interchange with their counterparts in the last four measurements. This physical symmetry is represented algebraically in the matrix X by the relation shown at 108 in FIG. 18. $X_1$ represents the top four rows of the X matrix and $X_2$ represents the bottom four rows of the X matrix. The algebraic relation represented bilateral symmetry is shown at 110 of FIG. 18, including the E matrix shown at 112. The −1 entries in the E matrix correspond to the functions in the Y matrix that include a negative $\beta$ term that is not squared.

A consequence of the relation 110 of FIG. 18 is that half of the coefficients of the X matrix are redundant. Thus, only the coefficients from the top half (or bottom half) of the X matrix need to be scheduled, and the coefficient of the bottom half (or top half) can be recovered using the equation $X_2=X_1E$. These and other reductions may help reduce the memory required to store the X matrix coefficients, and may reduce the processing time required to calculate the value of the functions in the Y matrix.

Selecting the appropriate X matrix for a current process condition may be done in a variety of ways. In one illustrative embodiment, the X matrix that corresponds to the nearest preselected process condition is selected. In another embodiment, and as shown at step 98 of FIG. 3, an interpolated X matrix is calculated from the three X matrices that correspond to the three nearest preselected process conditions, preferably by using barycentric interpolation.

Figure 4:
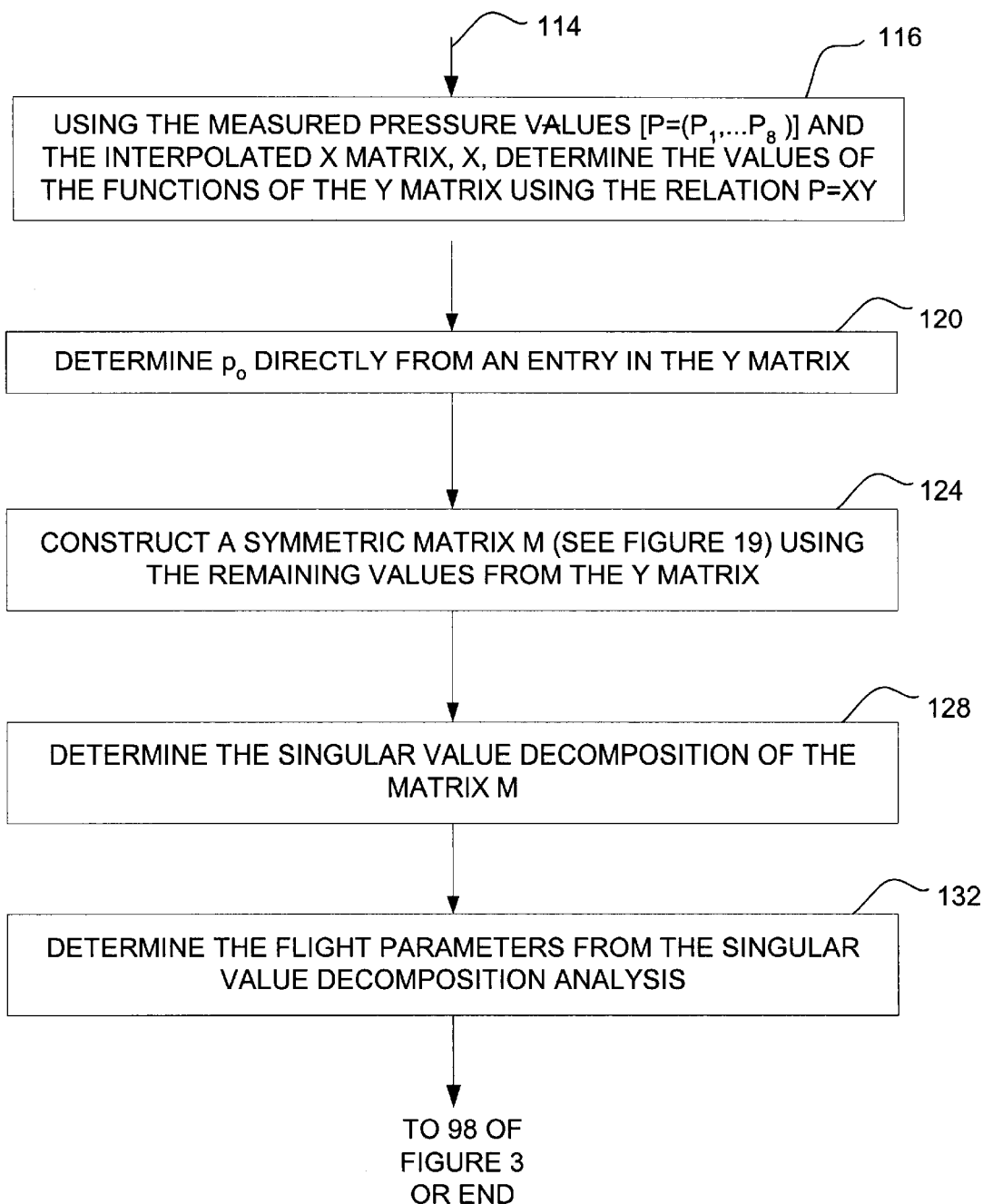
FIG. 4 is a flow diagram showing an illustrative method for calculating the current flight parameters from the relation P=XY.

For example, and referring to FIG. 13, a current flight condition ($p_0$, q-bar) is shown at 100. The three nearest non-collinear process conditions ($p_{01}$, q-bar$_1$), ($p_{02}$, q-bar$_2$) and ($p_{03}$, q-bar$_3$) are shown at 102, 104 and 106. To compute the interpolated X matrix, constants $c_1$, $c_2$ and $c_3$ are first computed from the relation: ($p_0$, q-bar)=$c_1$($p_{01}$, q-bar$_1$) +$c_2$($p_{02}$, q-bar$_2$)+$c_3$($p_{03}$, q-bar$_3$), where $c_1+c_2+c_3=1$ and $0 \leq c_i \leq 1$. Then the interpolated X matrix is computed using the relation $X=c_1X_1+c_2X_2+c_3X_3$. The interpolated X matrix can be used to calculate the values of the functions in the Y matrix at the current flight condition, as indicated at step 116 of FIG. 4.

Once the values of the functions in the Y matrix are calculated, the flight parameters including static pressure, dynamic pressure q-bar, attack angle $\alpha$, and sideslip $\beta$ may be calculated. In the illustrative embodiment, the static pressure $p_0$ may be determined directly from the Y matrix. FIG. 19 show an illustrative Y matrix 118, with the first entry y1 122 being the static pressure $p_0$. For the remaining flight parameters, a symmetric matrix M 126 may be constructed, as indicated at step 124 of FIG. 4. The symmetric matrix M 126 has the remaining flight parameters of the Y matrix 118 positioned symmetrically about its diagonal, as shown at 126 of FIG. 19.

The symmetric matrix M 126 has a singular value decomposition (SVD) of the form show at 130. The SVD computation can be performed by well-known robust numerical algorithms that execute quickly for small matrices like matrix M 126. When computing the SVD, the values of the U matrix ($u_1$, $u_2$ and $u_3$) and $\sigma_1$ are calculated. Computing the SVD of the matrix M is shown at step 128 of FIG. 4.

The desired flight parameters can be easily computed from the entries of the U matrix and $\sigma_1$ using the formulas shown in FIG. 20. For example, the flight parameter q-bar is in the second position y2 of the Y matrix 118, and corresponds to the 1-1 position in the M matrix 126. Referring to the SVD 130 of the M matrix 126, y2 equals $u_1\sigma_1u_1=\sigma_1u_1^2$. Thus, the value of q-bar can be easily computed by multiplying the value $\sigma_1$ by the value $u_1^2$. The remaining flight parameters can be likewise computed. For example, the attack angle $\alpha$ equals y3/y2 of the Y matrix 118, which as shown in FIG. 20, equals $u_2/u_1$ of the SVD 130 of the M matrix 126. Finally, the sideslip $\beta$ equals y4/y2 of the Y matrix 118, which corresponds to $u_3/u_1$ of the SVD 130 of the M matrix 126. The step of computing the flight parameters $p_0$, q-bar, $\alpha$ and $\beta$ in this manner is explicitly shown at step 132 of FIG. 4. Once the flight parameters $p_0$, q-bar, $\alpha$ and $\beta$ are computed, control is preferably passed back to step 98 of FIG. 3 to begin calculating another set of flight parameters using newly measured pressure values P.

FAILURE DETECTION

To increase the reliability of the system, it is often desirable to determine if any of the sensors that provide the current observation data have failed, preferably in real time. Once identified, the faulty observations can be removed from the analysis, and the failed sensors can be disabled or otherwise removed from the system.

FIGS. 5–8 show a flow diagram of an illustrative method for identifying failed sensors when the rank of the interpolated X matrix is equal to the number of functions in the Y matrix. The first step 180 of FIG. 5 preferably follows step 98 of FIG. 3, which calculates the interpolated X matrix. Step 180 determines if the rank of the interpolated X matrix is equal to the number of functions in the Y matrix (in the illustrative case seven). When the rank is equal to the number of functions in the Y matrix, a single solution exists for the relation P=XY. When the rank of the interpolated X matrix is less than the number of functions in the Y matrix, a family of solutions may exist, and control is passed to step 242 of FIG. 9.

Figure 5:
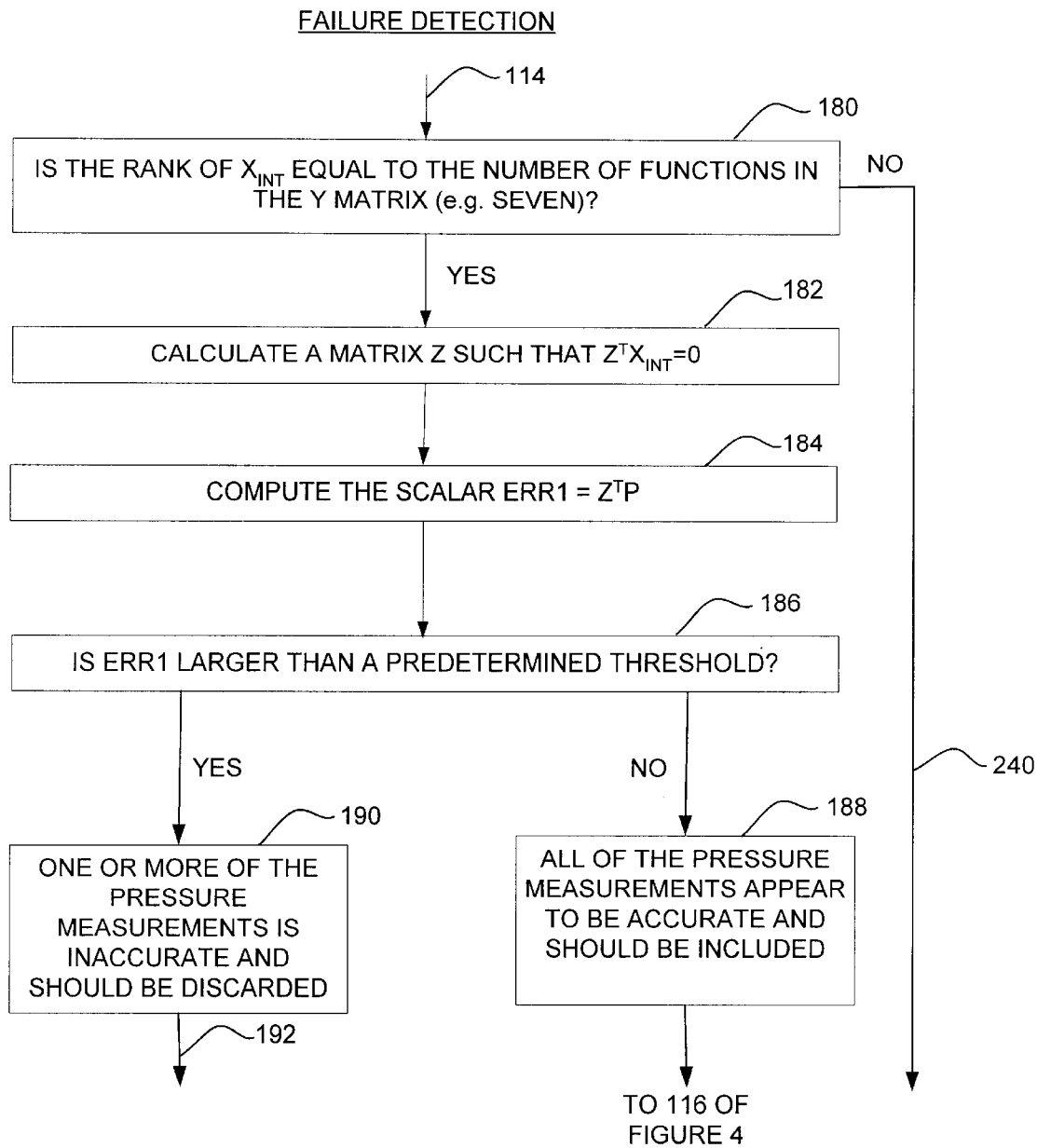
FIGS. 5–8 are a flow diagram showing an illustrative method for identifying failed sensors when the rank of the interpolated X matrix is equal to the number of functions in the Y matrix.

If the rank of the interpolated X matrix is equal to the number of functions in the Y matrix, a matrix Z is calculated such that $Z^T X=0$, as shown at step 182 of FIG. 5. Thereafter, and as shown at step 184, a scalar err1 is calculated by multiplying the matrix $Z^T$ with the P matrix, where the P matrix includes the current pressure measurements. As shown at step 186, the scalar err1 is compared to a predetermined threshold. If all of the sensors are functioning properly, the magnitude of err1 should be smaller than the predetermined threshold, as shown at 188. If all of the sensors are functioning properly, control is passed to step 1 16 of FIG. 4, and the desired flight parameters are calculated using all pressure measurements P1, . . . P8. If one or more of the sensors failed, the magnitude of err1 should be equal to or larger than the predetermined threshold, as shown at 190. In this case, the pressure measurements provided by the failed sensors are discarded from the analysis.

Figure 6:
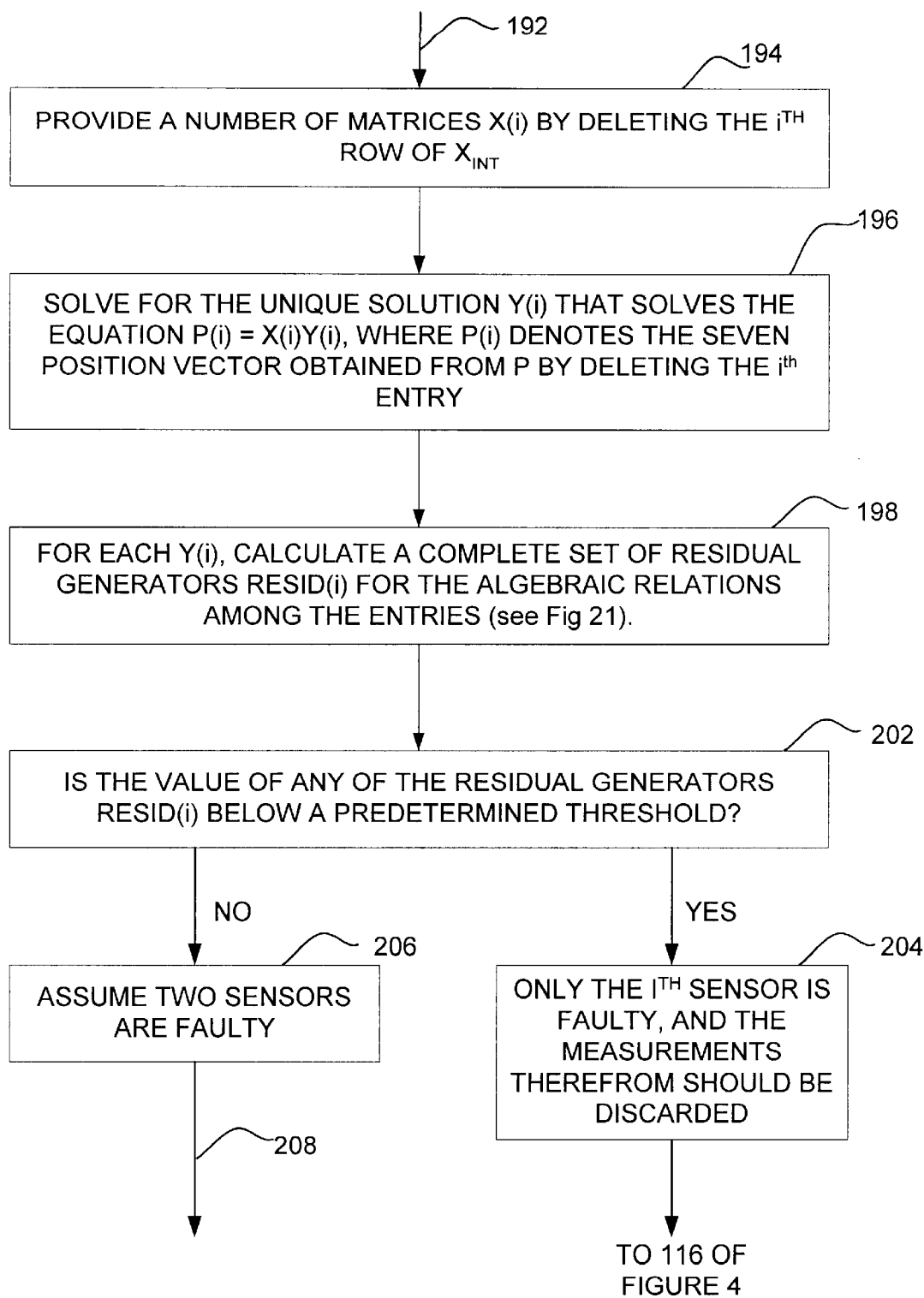

To determine which sensor or sensors failed, a system of equations P(i)=X(i)Y(i) may be provided, as shown at 194 of FIG. 6 The system of equations P(i)=X(i)Y(i) corresponds to the relation P=XY with the $i^{th}$ row of the P matrix and X matrix removed. With the $i^{th}$ row removed, the value of the functions in the Y(i) matrix can be calculated using the relation P(i)=X(i)Y(i), as shown at step 186. Next, a complete set of algebraic generators of the algebraic relations among the entries of the Y(i) matrix are provided, as shown at step 198. Illustrative algebraic generators 200 for the Y(i) matrix are shown in FIG. 21. The value of each of the generators is compared to a predetermined threshold, as shown at step 202. If all of the algebraic generators for any "i" are satisfied within a predetermined range, the one or more sensors that correspond to the $i^{th}$ pressure measurement are deemed to have failed, as shown at step 204. Once identified, the failed sensors are disabled or otherwise removed from the system, and control is passed back to step 116 of FIG. 4, wherein the desired flight parameters are calculated using all pressure measurements except those that correspond to the failed sensor or sensors. If none of the algebraic generators for any "i" are satisfied within a predetermined range, it is assumed that the sensors corresponding to two pressure measurements have failed, as shown at step 206.

Figure 7:
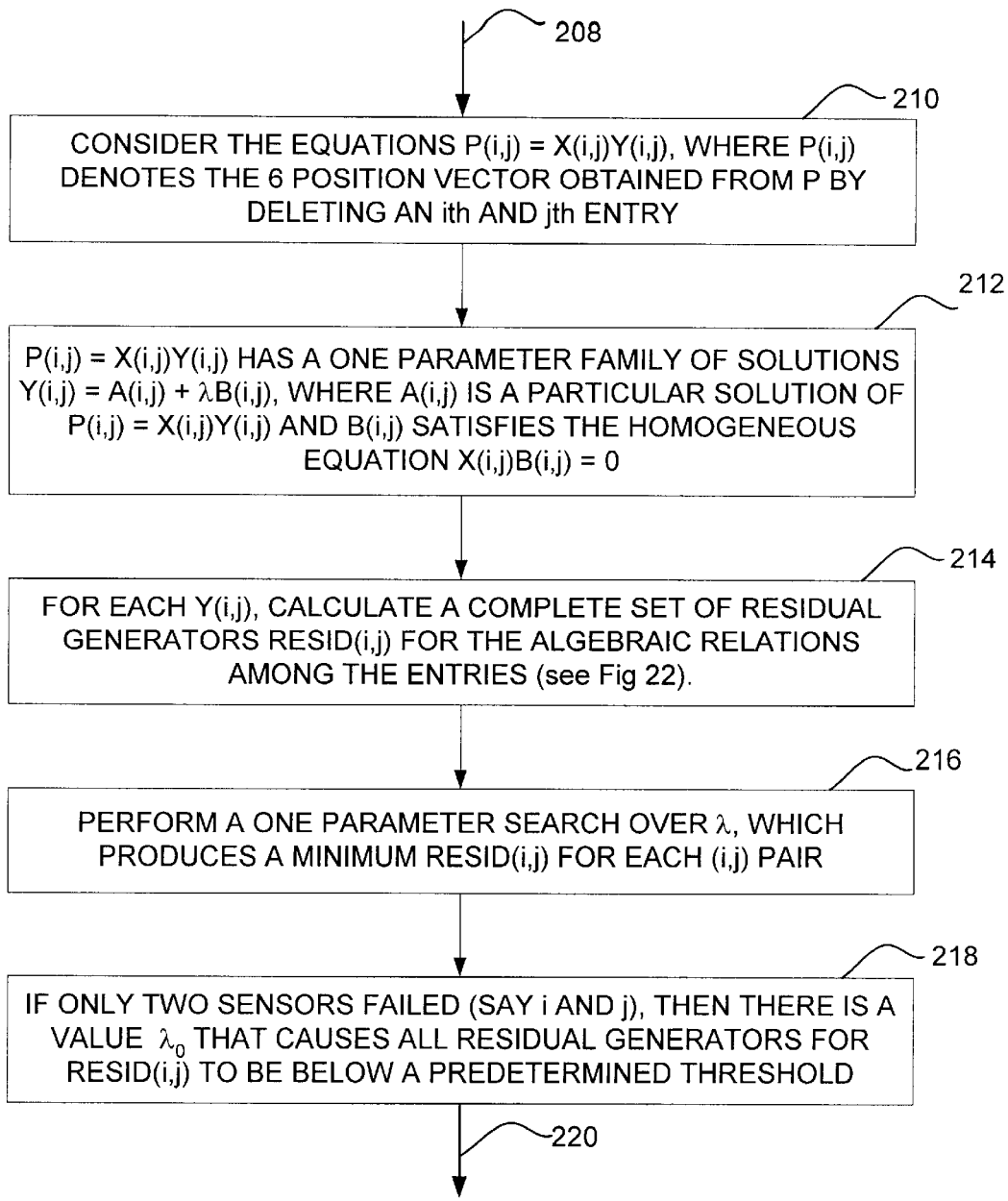

To identify the two faulty pressure measurements, a system of equations P(i,j)=X(i,j)Y(i,j) may be provided as shown at step 210 of FIG. 7. The system of equations P(i,j)=X(i,j)Y(i,j) corresponds to the relation P=XY with a $i^{th}$ row and a row of the P matrix and X matrix removed. With the $i^{th}$ row and $j^{th}$ row removed, the values of the functions in the Y(i,j) matrix are determined using the relation P(i,j)=X(i,j)Y(i,j). If the original interpolated X matrix has a rank of nine or higher, the rank of the X(i,j) matrix may still be at least seven, and thus may have a single solution. However, in the illustrative embodiment, the rank of the interpolated X(i,j) matrix is only six, or one smaller than the number of functions in the Y matrix. Therefore, the relation P(i,j)=X(i,j)Y(i,j) has a family of solutions.

When both the $i^{th}$ row and the $j^{th}$ row are removed, the family of solutions may take the form Y(i,j)=A+λB, where matrix A is a particular solution for Y(i,j), matrix B satisfies the homogeneous equation X(i,j)B=0, and λ is a scalar. In a preferred embodiment, a one parameter search over λ is performed to identify if all of the algebraic generators for any Y(i,j) can be satisfied within a predetermined range, as indicated at step 216 of FIG. 7. Illustrative algebraic generators for the Y(i,j) matrix are shown at 216 of FIG. 22. If a $λ_0$ exists that causes all of the algebraic generators 216 for any "i,j" pair to be satisfied within a predetermined range, the one or more sensors that correspond to the $i^{th}$ observation and the $j^{th}$ observation are deemed to have failed, as indicated at steps 224 and 226 of FIG. 8. Once identified, the failed sensors are disabled or otherwise removed from the system, and control is passed back to step 116 of FIG. 4, wherein the desired flight parameters are calculated using all pressure measurements except those that correspond to the failed sensor or sensors. It is recognized that a similar approach may be applied to cases where three or more measurements are deemed faulty.

Figure 8:
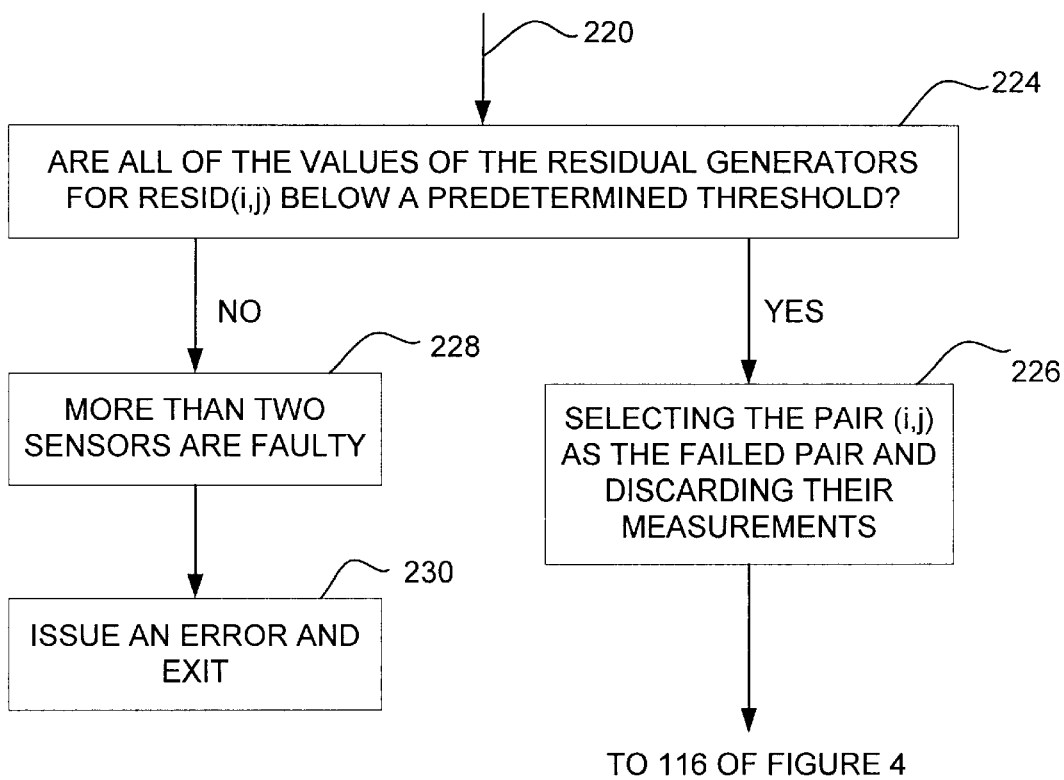
Figure 9:
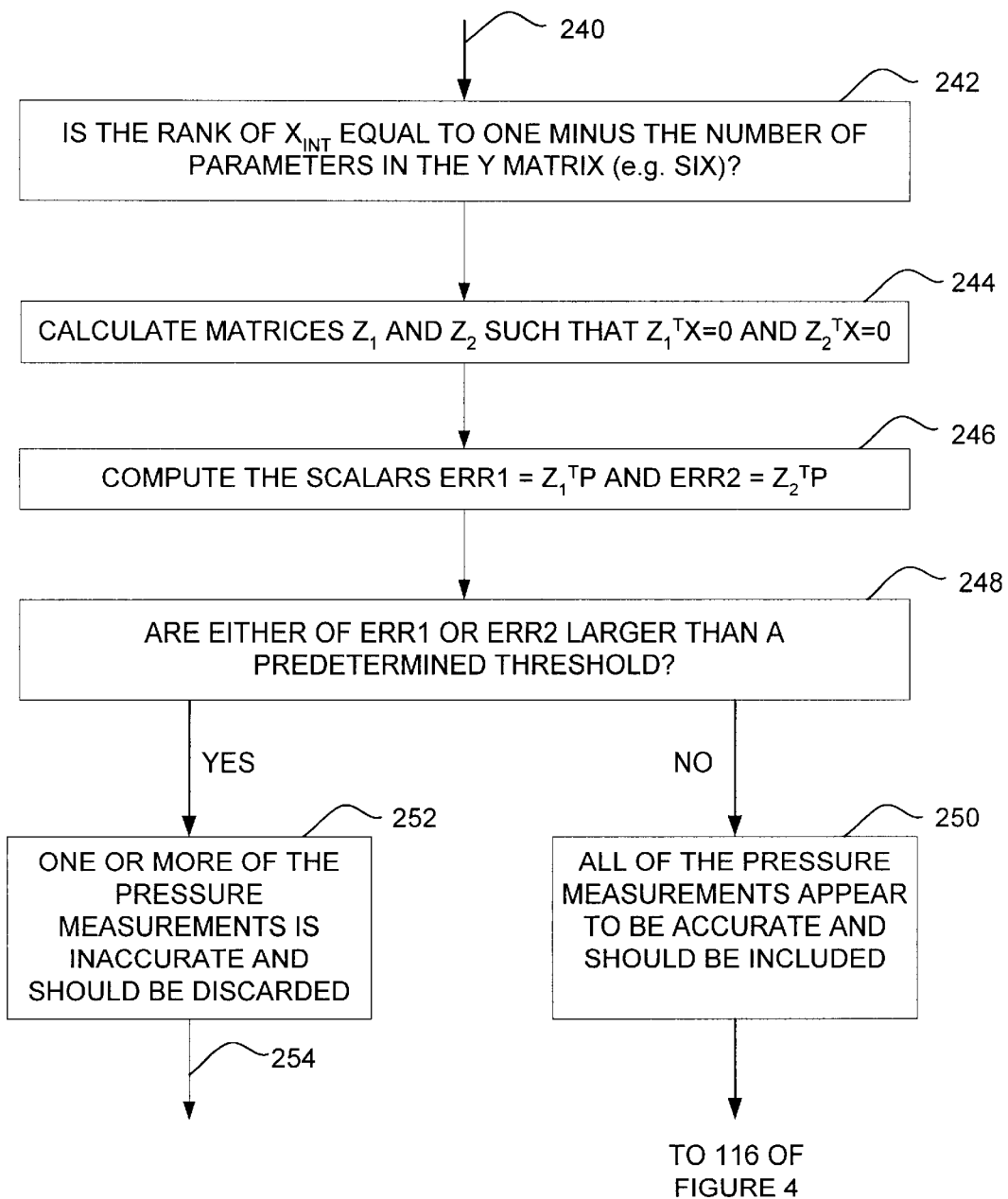
FIGS. 9–12 are a flow diagram showing an illustrative method for identifying failed sensors when the rank of the interpolated X matrix is equal to one minus the number of functions in the Y matrix.

As indicated at step 228 of FIG. 8, if there is no $λ_0$ that causes all of the algebraic generators 216 for any "i,j" pair to be satisfied within a predetermined range, more than two measurements are deemed to be faulty. In the illustrative embodiment, if more than two measurements have failed, an error is issued and the algorithm is exited, as indicated at step 230.

FIGS. 9–12 show a flow diagram of an illustrative method for identifying failed sensors when the rank of the interpolated X matrix is equal to one minus the number of functions in the Y matrix. Referring back to step 180 of FIG. 5, if the rank of the interpolated X matrix is less than the number of functions in the Y matrix, control is passed to step 242 of FIG. 9. Step 242 determines if the rank of the interpolated X matrix is equal to one minus the number of functions in the Y matrix, or in this case six. If the rank of the interpolated X matrix is six, control is passed to step 244. Step 244 calculates matrices $Z_1$ and $Z_2$, such that $Z_1^T X=0$ and $Z_2^T X=0$. Thereafter, a first scalar err1 is calculated by multiplying the matrix $Z_1^T$ with the P matrix, and a second scalar err2 is calculated by multiplying the matrix $Z_2^T$ with the P matrix, as shown at step 246. Next, and as indicated at step 248, the first scalar err1 and the second scalar err2 are compared to a predetermined threshold value. If both err1 and err2 are less than the predetermined threshold, all of the pressure measurements are deemed to be accurate, and control is passed to step 116 of FIG. 4. If, however, either err1 or err2 is larger than the predetermined threshold, one or more pressure measurements are deemed to be faulty, as indicated at step 252.

Figure 10:
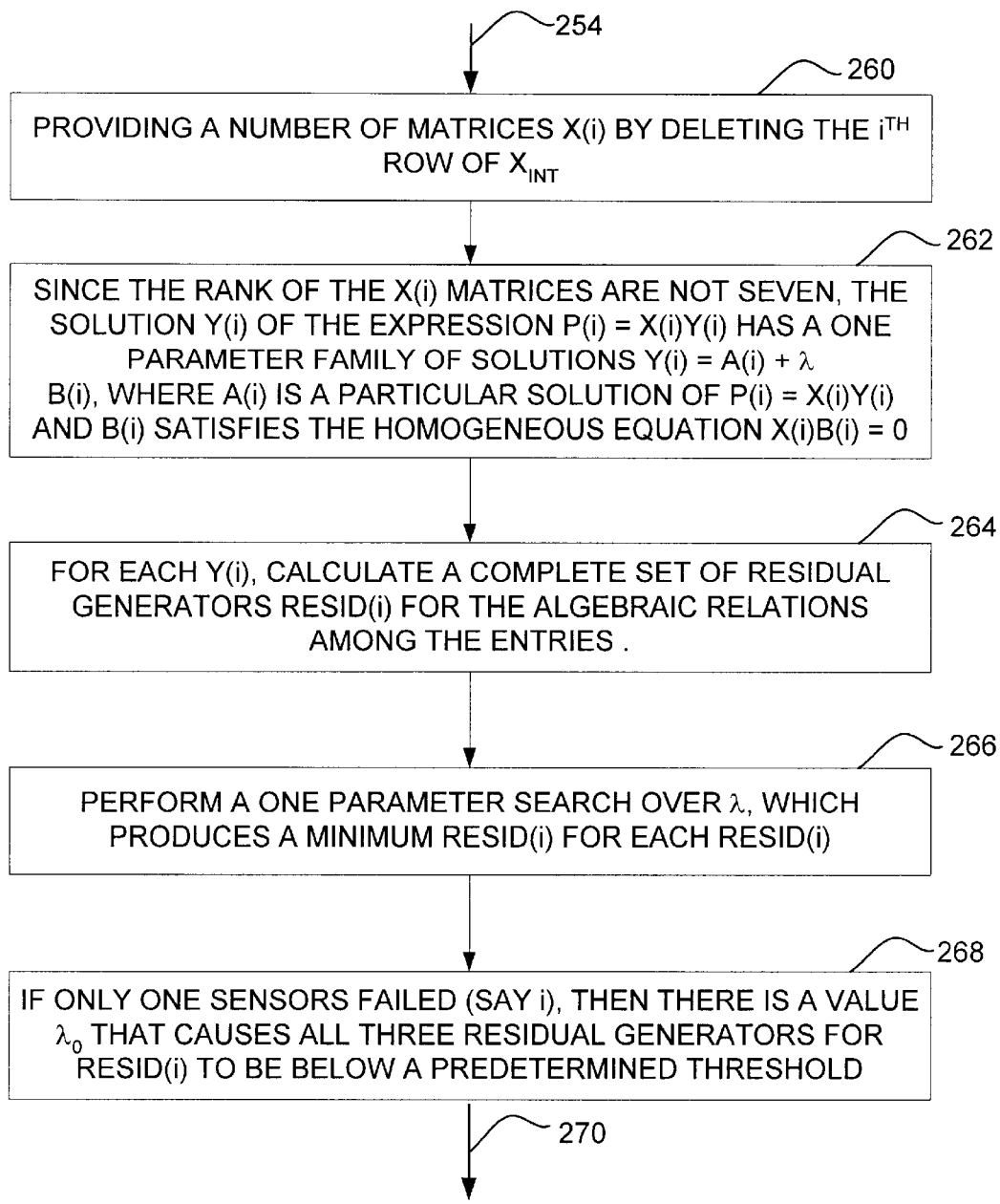
Figure 11:
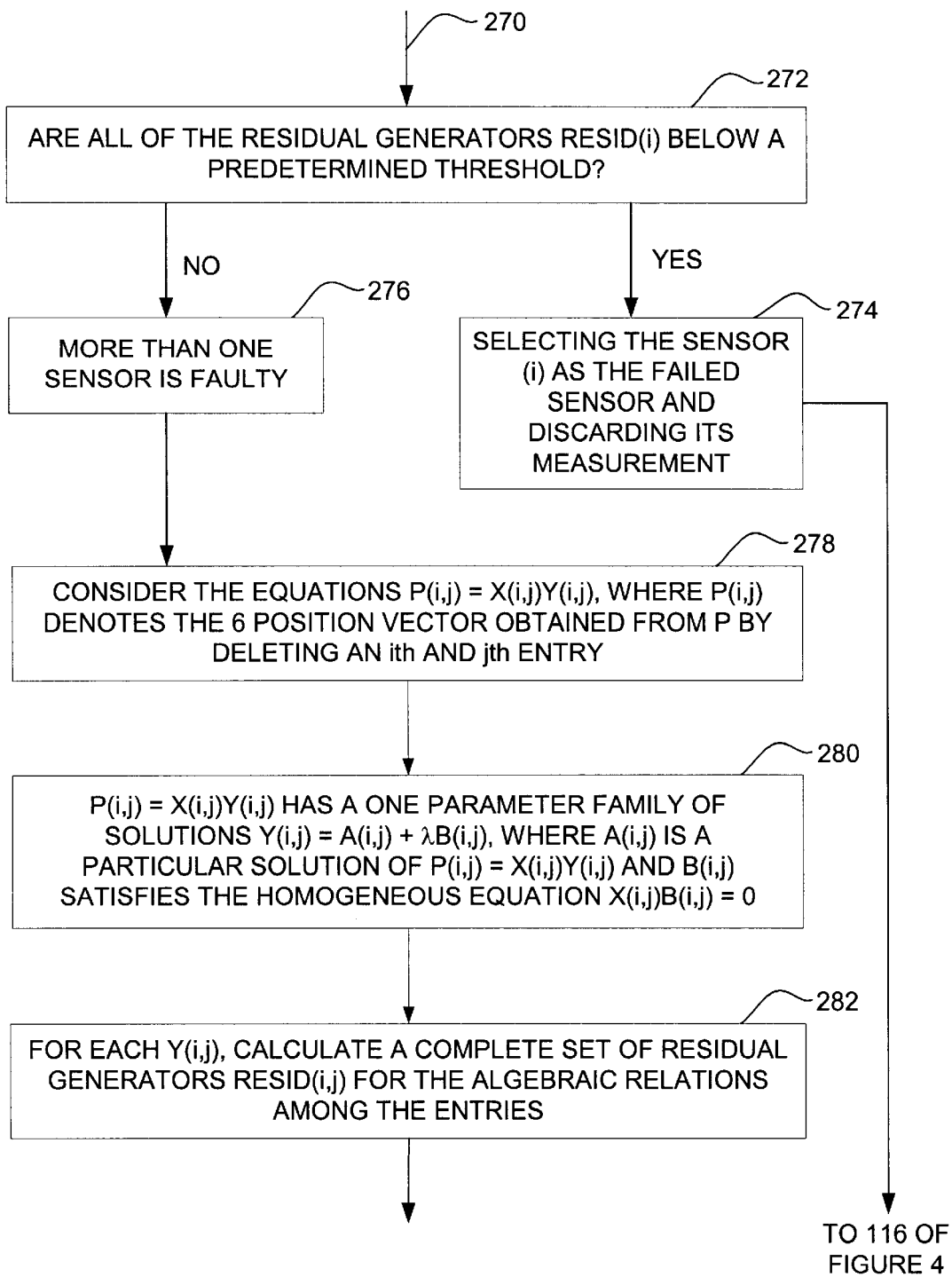

Now referring to FIG. 10, if one or more pressure measurements are deemed to be faulty, a system of equations P(i)=X(i)Y(i) may be provided by deleting the $i^{th}$ row of the P matrix and X matrix, as indicated at step 260. With the $i^{th}$ row removed, the value of the functions in the Y(i) matrix are calculated using the relation P(i)=X(i)Y(i), as shown at step 262. Because the rank of the interpolated X matrix is less than the number of functions in the Y matrix (e.g., seven), the solution Y(i) of the relation P(i)=X(i)Y(i) has a family of solutions of the form Y(i)=A+λB, where matrix A is a particular solution for Y(i), matrix B satisfies the homogeneous equation X(i)B=0, and X is a scalar.

In a preferred embodiment, a one parameter search over λ is performed to identify if all of the algebraic generators for any Y(i) are satisfied within a predetermined range, as indicated at step 266 of FIG. 10. Illustrative algebraic generators for the Y(i) matrix are shown at 210 of FIG. 21. If only one pressure measurement was faulty, a $λ_0$ exists that causes all of the algebraic generators 200 for a particular "i" to be satisfied within a predetermined range, as indicated at step 268 and 272 of FIG. 11. If all of the algebraic generators for a resid(i) are below a predetermined threshold, control is passed to step 274. If not, control is passed to step 276.

Step 274 selects the sensor or sensors that correspond to the algebraic generator resid(i) as the failed sensor or sensors, discards the corresponding pressure measurement, and disables or otherwise removes the failed sensor or sensors from the system. Control is then passed to step 116 of FIG. 4, wherein the desired flight parameters are calculated using all pressure measurements except those that correspond to the failed sensor or sensors.

If none of the algebraic generators resid(i) are below the predetermined threshold, it is assumed that two pressure measurements are faulty as indicated at step 276. To identify the two faulty pressure measurements, a system of equations $P(i,j)=X(i,j)Y(i,j)$ may be provided, as shown at step 278 of FIG. 11. The system of equations $P(i,j)=X(i,j)Y(i,j)$ corresponds to the relation $P=XY$ with a $i^{th}$ row and a $j^{th}$ row of the P matrix and X matrix removed. With the $i^{th}$ row and $j^{th}$ row removed, the values of the functions in the $Y(i,j)$ matrix are determined using the relation $P(i,j)=X(i,j)Y(i,j)$.

Because the rank of each $X(i,j)$ matrix is now four (e.g., 6-2), the relation $P(i,j)=X(i,j)Y(i,j)$ has a family of solutions which take the form $Y(i,j)=A+\lambda B$, where matrix A is a particular solution for $Y(i,j)$, matrix B satisfies the homogeneous equation $X(i,j)B=0$, and $\lambda$ is a scalar. In a preferred embodiment, a one parameter search is performed over $\lambda$ to identify if all of the algebraic generators for any $Y(i,j)$ can be satisfied within a predetermined range, as indicated at step 284 of FIG. 12. Illustrative algebraic generators for the $Y(i,j)$ matrix are shown at 216 of FIG. 22. If a $\lambda_0$ exists that causes all of the algebraic generators 216 for any "i,j" pair to be satisfied within a predetermined range, the one or more sensors that correspond to the $i^{th}$ observation and the $j^{th}$ observation are deemed to have failed, as indicated at steps 286, 288 and 290. Once identified, the failed sensors may be disabled or otherwise removed from the system, and control is passed back to step 116 of FIG. 4, wherein the desired flight parameters may be calculated using all pressure measurements except those that correspond to the failed sensor or sensors. It is recognized that a similar approach may be applied to cases where three or more measurements are faulty.

Figure 12:
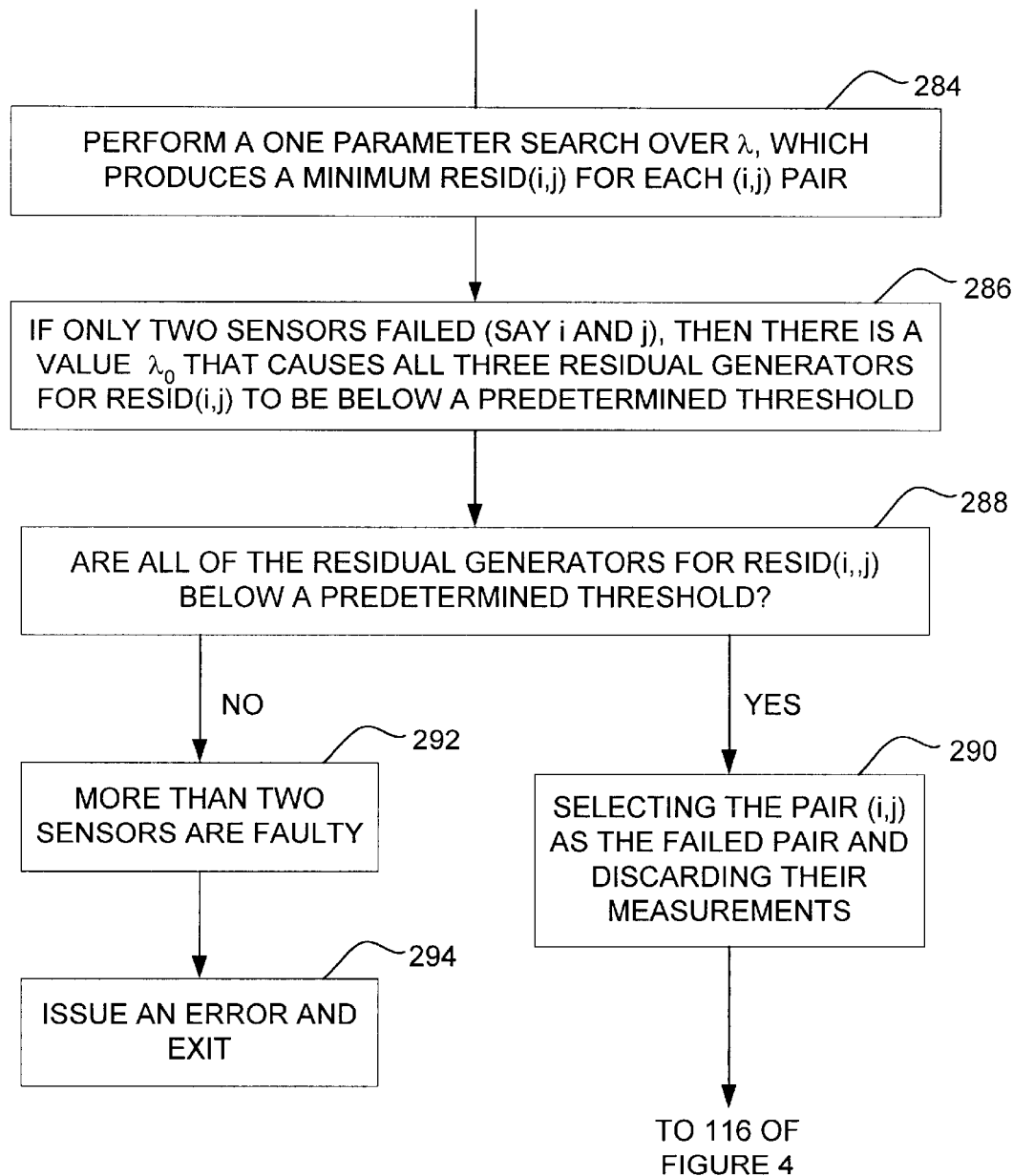

Referring now to step 292 of FIG. 12, if no $\lambda_0$ exists that causes all of the algebraic generators 216 for any "i,j" pair to be satisfied within a predetermined range, more than two measurements are deemed to be faulty. In the illustrative embodiment, if more than two measurements are faulty, an error is issued and the algorithm is exited, as indicated at step 294.

Having thus described the preferred embodiments of the present invention, those of skill in the art will readily appreciate that the teachings found herein may be applied to yet other embodiments within the scope of the claims hereto attached.

What is claimed is:

1. A method for recursive state estimation of a process, the method comprising the steps of:
    obtaining a number of current observations of the process from one or more sensors;
    providing the current observations to a filter that has a general form $P=XY$, where P is a matrix that includes the number of current observations, Y is a matrix of functions that model the process, and X is a coefficient matrix relating the functions in the Y matrix to the current observations of the P matrix; and
    calculating the current state of the process by determining a value of selected functions in the Y matrix.

2. A method according to claim 1, wherein said obtaining, providing and calculating steps are repeated.

3. A method according to claim 1, wherein said filter is a non-linear filter that takes the general form of $P=XY$, where P is a matrix that includes the number of current observations, Y is a matrix of functions, including non-linear functions, that model the non-linear process, and X is a coefficient matrix relating the functions in the Y matrix to the current observations of the P matrix.

4. A method according to claim 3, wherein said non-linear filter calculates the value of the functions in the Y matrix using the current observations of the P matrix and selected coefficients of the X matrix.

5. A method according to claim 4, further comprising the steps of:
    identifying a current process condition by examining the current observations of the P matrix;
    providing an X matrix that corresponds to the current process condition; and
    scheduling the X matrix for use during the calculating step of claim 4.

6. A method according to claim 4, further comprising the steps of:
    providing an X matrix for each of a number of preselected process conditions;
    identifying the current process condition by examining the current observations of the P matrix;
    identifying three nearest preselected process conditions to the current process condition;
    computing an interpolated X matrix for the current process condition from the three nearest predefined process conditions; and
    scheduling the interpolated X matrix for use during the calculating step of claim 4.

7. A method according to claim 3, wherein the P matrix also includes a number of parameters reflecting a previous state of the non-linear process.

8. A method for recursive state estimation of a non-linear process, the method comprising the steps of:
    providing a matrix P that includes current observation data of the process, the current observation data provided by one or more sensors;
    providing a matrix Y that includes one or more functions, including one or more non-linear functions, that model the non-linear process;
    providing a matrix X that includes coefficients that relate functions in the Y matrix to the current observation data of the P matrix;
    determining a value for at least selected functions in the Y matrix using relation $P=XY$; and
    estimating the current state of the non-linear process using selected functions in the Y matrix.

9. A method according to claim 8, wherein said estimating step estimates the current state of the non-linear process by estimating the current value of selected process parameters of the non-linear process.

10. A method according to claim 9, wherein said estimating step estimates the current value of the selected process parameters using a singular value decomposition algorithm.

11. A method according to claim 9, wherein said non-linear process is a flight control process.

12. A method according to claim 11, wherein said flight control process includes identifying the static pressure, dynamic pressure, attack angle and sideslip of an airplane.

13. A method according to claim 12, wherein the current observations of the P matrix include pressure measurements at various locations on the airplane.

14. A method according to claim 13, wherein the one or more functions in the Y matrix include static pressure, dynamic pressure, dynamic pressure times attack angle, dynamic pressure times sideslip, dynamic pressure times the square of attack angle (q-bar*$\alpha^2$), dynamic pressure times attack angle times sideslip, and dynamic pressure times the square of sideslip (q-bar*$\beta^2$).

15. A method according to claim 14, wherein said estimating step estimates the current value of the static pressure, dynamic pressure, attack angle and sideslip of the airplane using selected values of the Y matrix.

16. A method according to claim 15, wherein said estimating step estimates the current value of the static pressure, dynamic pressure, attack angle and sideslip of the airplane using a singular value decomposition algorithm.

17. A method according to claim 9, wherein the current observation data entries in the P matrix are generated by one or more sensors.

18. A method according to claim 17, further comprising the step of determining if any of the sensors have failed.

19. A method according to claim 18, wherein said determining step of claim 18 includes the steps of:

calculating a matrix Z, such that $Z^T X=0$;

calculating a scalar err1 by multiplying the matrix $Z^T$ times the matrix P; and determining if the magnitude of err1 is larger than a predetermined threshold, and if so, concluding that one or more of the sensors failed.

20. A method according to claim 19, wherein if said determining step of claim 19 determined that one or more of the sensors failed, the method further comprises the steps of:

providing a system of equations P(i)=X(i)Y(i), which corresponds to the relation P=XY with the $i^{th}$ row of the P and X matrix removed;

determining the value of the functions in the Y(i) matrix using the relation P(i)=X(i)Y(i);

providing a complete set of algebraic generators of the algebraic relations among the entries of the Y(i) matrix; and identifying the one or more sensors that correspond to the $i^{th}$ row of the P matrix as the failed sensors if all of the algebraic generators that correspond to the Y(i) matrix are satisfied within a predetermined range.

21. A method according to claim 20, wherein if said identifying step of claim 20 determines that the algebraic generators for each of the Y(i) matrices are not satisfied within a predetermined range, the method further comprises the steps of:

providing a system of equations P(i,j)=X(i,j)Y(i,j), which corresponds to the relation P=XY with the $i^{th}$ row and the $j^{th}$ row of the P and X matrix removed;

determining the value of the functions in the Y(i,j) matrix using the relation P(i,j)=X(i,j)Y(i,j);

providing a complete set of algebraic generators of the algebraic relations among the entries of the Y(i,j) matrix; and identifying the one or more sensors that correspond to the $i^{th}$ row and the $j^{th}$ row of the P matrix as the failed sensors if all of the algebraic generators are satisfied within a predetermined range.

22. A method according to claim 19, wherein if said determining step of claim 19 determined that one or more of the sensors failed, the method further comprises the steps of:

providing a system of equations P(i)=X(i)Y(i), which corresponds to the relation P=XY with the $i^{th}$ row of the P and X matrix removed;

determining a family of solutions for the functions in the Y(i) matrix using the relation P(i)=X(i)Y(i), wherein the family of solutions have the form Y(i)=A+$\lambda$B, where matrix A is a particular solution for Y(i), matrix B satisfies the homogeneous equation X(i)B=0, and $\lambda$ is a scalar;

providing a complete set of algebraic generators of the algebraic relations among the entries of the Y(i) matrix;

performing a one parameter search over $\lambda$ to identify if all of the algebraic generators for any Y(i) are satisfied within a predetermined range; and identifying the one or more sensors that correspond to the $i^{th}$ row of the P matrix as the failed sensors if the performing step identifies that all of the algebraic generators for Y(i) are satisfied within the predetermined range.

23. A method according to claim 18, wherein said determining step of claim 18 includes the steps of:

calculating a first matrix $Z_1$, such that $Z_1^T X=0$;

calculating a second matrix $Z_2$, such that $Z_2^T X=0$;

calculating a first scalar err1 by multiplying the matrix $Z_1^T$ times the matrix P;

calculating a second scalar err2 by multiplying the matrix $Z_2^T$ times the matrix P; and determining if the magnitude of either err1 or err2 is larger than a predetermined threshold, and if so, concluding that one or more of the sensors failed.

24. A method according to claim 8, further comprising the steps of:

identifying a current process condition by examining the current observations of the P matrix;

providing an X matrix that corresponds to the current process condition; and scheduling the X matrix for use during the determining step of claim 8.

25. A method according to claim 8, wherein said determining step includes the steps of:

providing an X matrix for each of a number of preselected process conditions;

identifying the current process condition by examining the current observations of the P matrix;

identifying the three nearest preselected process conditions to the current process condition;

computing an interpolated X matrix for the current process condition from the three nearest predefined process conditions; and scheduling the interpolated X matrix for use during the determining step of claim 8.

26. A method according to claim 25, wherein said computing step computes the interpolated X matrix using barycentric interpolation.

27. A method according to claim 8, further comprising the steps of:

providing an X matrix for each of a number of preselected process conditions;

providing a diagonal matrix W for each of the number of preselected process conditions, wherein each diagonal matrix has the selected functions in the Y matrix on its diagonal;

setting selected functions in the W matrix to approximate expected values for the corresponding process condition;

multiplying the diagonal matrix W by the corresponding X matrix to compute a normalized X matrix;

identifying the largest entry in each row of the normalized X matrix;

identifying those entries in each row of the normalized X matrix that fall below a predetermined threshold value relative to the largest entry of the row; and setting the coefficients of the corresponding X matrix that correspond to the entries in the normalized X matrix that fall below the predetermined threshold value to zero.

28. A data processing system for recursive state estimation of a process, the data processing system comprising:

storage means for storing a number of current observations; and a filter coupled to said storage means, said filter having a general form P=XY, where P is a matrix that includes the number of current observations, Y is a matrix of functions that model the process, and X is a coefficient matrix relating the functions in the Y matrix to the current observations of the P matrix, said filter receiving said current observations from said storage means and calculating the current state of the process by determining selected functions in the Y matrix.

29. A data processing system for recursive state estimation of a non-linear process, the data processing system comprising:

storage means for storing a number of current observations; and a non-linear filter coupled to said storage means, said non linear filter receiving said current observations from said storage means and calculating the current state of the non-linear process using matrix factorization.

30. A data processing system according to claim 29, wherein said non-linear filter calculates the current state of the non-linear process using the relation P=XY, where P is a matrix that includes the number of current observations, Y is a matrix of functions including non-linear functions that model the non-linear process, and X is a coefficient matrix relating the functions in the Y matrix to the current observations of the P matrix.

31. A data processing system according to claim 30, wherein said non-linear filter determines the value of the functions in the Y matrix using the relation P=XY, and estimates the current state of the non-linear process using selected functions in the Y matrix.

32. A data processing system according to claim 31, wherein said non-linear filter estimates the current state of the non-linear process by estimating the current value of selected process parameters of the non-linear process.

33. A data processing system according to claim 32, wherein said non-linear filter estimates the current value of the selected process parameters of the non-linear process by using a singular value decomposition algorithm.

34. A data processing system according to claim 29, wherein said non-linear filter comprises a microprocessor.

* * * * *